United States Patent
Singh et al.

(10) Patent No.: US 10,328,833 B2
(45) Date of Patent: Jun. 25, 2019

(54) CONSOLE DRAWER WITH DELAYED ARTICULATING CUP HOLDERS

(71) Applicant: GM GLOBAL TECHNOLOGY OPERATIONS LLC, Detroit, MI (US)

(72) Inventors: Gurnek Singh, Sterling Heights, MI (US); Thomas Hallman, Linden, MI (US); Scott J. Fast, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 44 days.

(21) Appl. No.: 15/486,733

(22) Filed: Apr. 13, 2017

(65) Prior Publication Data

US 2018/0297500 A1     Oct. 18, 2018

(51) Int. Cl.
*B60N 3/10*     (2006.01)

(52) U.S. Cl.
CPC .............. *B60N 3/102* (2013.01); *B60N 3/105* (2013.01)

(58) Field of Classification Search
CPC ........ B60N 2/793; B60N 3/101; B60N 2/773; B60N 3/102; B60N 3/00; B60N 2/75; B60N 2/753; B60N 2/757; B60N 3/10
USPC .......... 296/24.34, 37.8, 1.08, 1.09, 24.3, 64, 296/190.01, 193.04; 29/428, 453, 430, 29/464, 527.1, 825
See application file for complete search history.

(56) References Cited

U.S. PATENT DOCUMENTS

| | | | |
|---|---|---|---|
| 7,810,969 B2 * | 10/2010 | Blackmore | B60N 3/101 362/459 |
| 8,939,491 B2 * | 1/2015 | Gillis | B60N 3/101 296/24.34 |
| 9,387,808 B2 * | 7/2016 | Kearney | B60R 7/04 |
| 2013/0320689 A1 * | 12/2013 | Hishon | B60N 3/101 296/24.34 |
| 2015/0175219 A1 * | 6/2015 | Kiester | B62D 27/04 296/187.01 |

(Continued)

FOREIGN PATENT DOCUMENTS

| | | |
|---|---|---|
| DE | 4444955 A1 | 7/1998 |
| DE | 10109119 A1 | 1/2003 |

(Continued)

OTHER PUBLICATIONS

DPMA, Office Action issued in German Patent Application No. 10 2018 108 754.3, dated Jan. 21, 2019.

*Primary Examiner* — D Glenn Dayoan
*Assistant Examiner* — Sunsurraye Westbrook
(74) *Attorney, Agent, or Firm* — Lorenz & Kopf LLP

(57) ABSTRACT

Methods and apparatus are provided for a console assembly for a vehicle. The apparatus comprises a console structure and a movable structure that is supported for movement in and out from the console structure. Additionally, the console assembly includes a cup holder structure that is supported by the movable structure. The cup holder structure includes a cup holder that is supported for movement by the movable structure between a retracted position and an extended position. The cup holder is configured to remain substantially in the retracted position as the movable structure moves between a first position and a second position. The cup holder is configured to move between the retracted position and the extended position as the movable structure moves between the second position and a third position.

19 Claims, 7 Drawing Sheets

(56) References Cited

U.S. PATENT DOCUMENTS

2016/0039324 A1\* 2/2016 Muiter .................. B60N 3/108
                                                                           362/253

FOREIGN PATENT DOCUMENTS

| DE | 69718996 T2 | 1/2004 |
| DE | 10317523 A1 | 1/2005 |

\* cited by examiner

CONSOLE DRAWER WITH DELAYED ARTICULATING CUP HOLDERS

INTRODUCTION

The present disclosure generally relates to a vehicle and, more particularly, relates to a vehicle console assembly with a drawer or other movable structure with delayed articulating cup holders.

Vehicles may include one or more console assemblies. The console assembly may cover over an underlying portion of the vehicle to provide the vehicle interior with visually pleasing features. The console assembly may also provide various functionality to the user. For example, some console assemblies may include one or more cup holders where the user may conveniently rest a cup or other container.

However, the vehicle interior is a limited space. Some console assemblies may not fit within certain vehicle interiors. Accordingly, it is desirable to provide a console assembly that is compact. It is also desirable to provide a compact console assembly that includes one or more cup holders and/or other features. Furthermore, other desirable features and characteristics of the present disclosure will become apparent from the subsequent detailed description and the appended claims, taken in conjunction with the accompanying drawings and the background of the present disclosure.

SUMMARY

A console assembly is provided for a vehicle. The console assembly comprises a console structure with an opening. The console assembly also includes a movable structure that is received within the opening and that is supported for movement relative to the console structure between a first position, a second position, and a third position. The movable structure is configured to move through the second position as the movable structure moves between the first position and the third position. Additionally, the console assembly includes a cup holder structure that is supported by the movable structure. The cup holder structure includes a cup holder that is supported for movement by the movable structure between a retracted position and an extended position. The cup holder is configured to remain substantially in the retracted position as the movable structure moves between the first position and the second position. The cup holder is configured to move between the retracted position and the extended position as the movable structure moves between the second position and the third position.

Additionally, a console assembly is provided for a vehicle. The console assembly includes a console structure having a first engagement member and an opening. The console assembly also includes a slider structure that is received within the opening and that is supported for sliding movement relative to the console structure between a first position, a second position, and a third position. The slider structure is configured to move through the second position as the slider structure moves between the first position and the third position. The console assembly further includes a cup holder structure that is supported by the slider structure. The cup holder structure includes a cup holder that is supported for rotational movement by the slider structure between a retracted position and an extended position. The cup holder is configured to remain substantially in the retracted position as the slider structure slides between the first position and the second position. The cup holder is configured to rotate between the retracted position and the extended position as the slider structure moves between the second position and the third position. Moreover, the console assembly includes an elongate member having a second engagement member. The first engagement member is configured to engage the second engagement member at the second position of the slider structure. The elongate member is coupled to the cup holder structure to rotate the cup holder from the retracted position to the extended position as the slider structure moves from the second position to the third position.

Furthermore, a vehicle is disclosed that includes a console structure having a first engagement member and an opening. The vehicle also includes a slider structure that is received within the opening and that is supported for sliding movement relative to the console structure between a first position, a second position, and a third position, the slider structure configured to move through the second position as the slider structure moves between the first position and the third position. The vehicle further includes a cup holder structure that is supported by the slider structure. The cup holder structure includes a cup holder that is supported for rotational movement by the slider structure between a retracted position and an extended position. The cup holder is configured to remain substantially in the retracted position as the slider structure slides between the first position and the second position. The cup holder is configured to rotate between the retracted position and the extended position as the slider structure moves between the second position and the third position. The vehicle additionally includes an elongate member having a second engagement member. The first engagement member is configured to engage the second engagement member at the second position of the slider structure. The elongate member is coupled to the cup holder structure to rotate the cup holder from the retracted position to the extended position as the slider structure moves from the second position to the third position.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the present disclosure or the application and its uses. Furthermore, there is no intention to be bound by any theory presented in the preceding background or the following detailed description.

Figure 1:
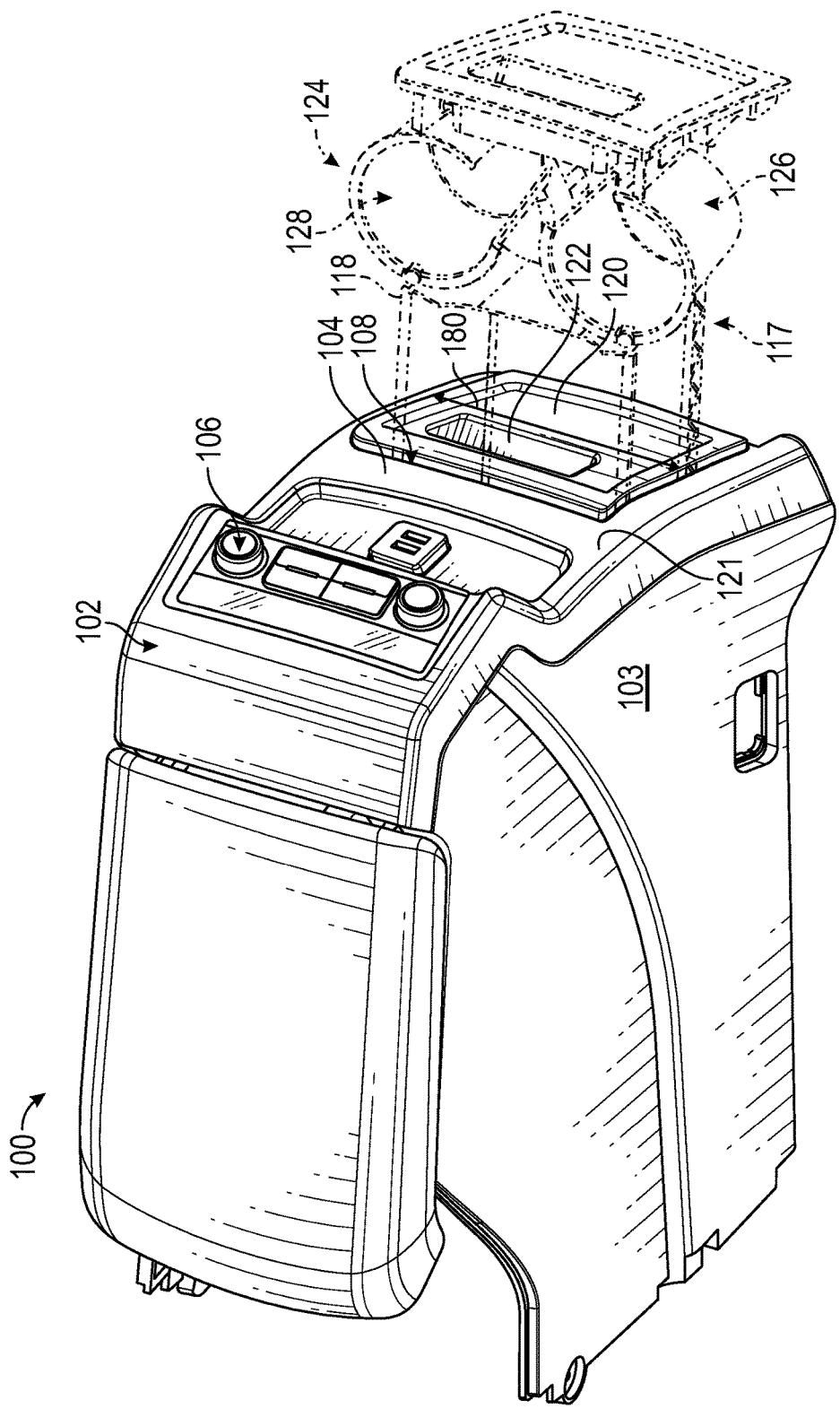
FIG. 1 is a perspective view of a console assembly configured according to example embodiments of the present disclosure.

Referring to FIG. 1, a console assembly 100 is illustrated according to exemplary embodiments of the present disclosure. As will be discussed, the console assembly 100 may be constructed for a vehicle, such as a passenger car, van, truck, SUV, or other vehicle. The console assembly 100 may be configured for any suitable area of the vehicle interior. For example, the console assembly 100 may be configured as a dashboard console, a between-seat console, an under-seat console, a floor-mounted console, a door-mounted console, or other type of console.

The console assembly 100 may generally include a console structure 102. The console structure 102 may include an outer housing 103 with a front face 104. In some embodiments, the front face 104 may include a plurality of controls 106, such as knobs, buttons, and/or other controls for inputting a user command for controlling a vehicle system. The front face 104 may also include components of an entertainment system (e.g., a display, a speaker) or other vehicle systems without departing from the scope of the present disclosure.

The outer housing 103 may be substantially hollow. Also, the outer housing 103 may include an opening 108, for example, in the front face 104. The opening 108 may provide access to the interior of the outer housing 103.

Additionally, the console structure 102 may include a support bracket 110 (FIGS. 2-7), which is fixed within the housing 103. The support bracket 110 may include a base 112, a first side portion 114, and a second side portion 116. In some embodiments, the first side portion 114 and/or the second side portion 116 may include an engagement member 115. In some embodiments, the engagement member 115 may be a hook-like structure that bends inwardly toward the center of the opening 108.

The console assembly 100 may further generally include a movable structure 117 that is supported by the console structure 102 for movement between a plurality of positions. In FIG. 1, for example, the movable structure 117 is shown in a first position (e.g., a closed position) in solid lines. The movable structure 117 is shown in a second position (e.g., an open position) in phantom lines as well. It will be appreciated that the movable structure 117 may also include a third position (e.g., an intermediate position). The third position may be defined between the first and second positions. In other words, the movable structure 117 may be configured to move through the third, intermediate position as the movable structure 117 moves between the first, closed position and the second, open position. It will be appreciated that the movable structure 117 may be supported for movement in a variety of ways and using a variety of support structures without departing from the scope of the present disclosure.

For example, as shown in FIG. 1, the movable structure 117 may be supported for sliding, linear movement relative to the console structure 102. As such, the movable structure 117 may comprise a slider structure 118. In some embodiments, the slider structure 118 may be configured similar to a drawer; however, it will be appreciated that the slider structure 118 may be otherwise configured without departing from the scope of the present disclosure.

In some embodiments, the base 112 of the support bracket 110 may support the slider structure 118 via a conventional slider bearing 130 (FIG. 2) and/or other support structures. (The slider bearing 130 is hidden in FIGS. 3 and 4 to more clearly illustrate the console assembly 100.) Also, the slider structure 118 may include an end cap 120. When the slider structure 118 is in a closed position (shown in solid lines in FIG. 1), the end cap 120 may close off the opening 108. Also, as shown in FIG. 1, the end cap 120 may lie substantially flush with a surrounding outer surface 121 of the console structure 102 when in the closed position. In some embodiments, the end cap 120 may include a handle 122, which the user may grasp for sliding the slider structure 118 into and out of the housing 103.

Figure 6:
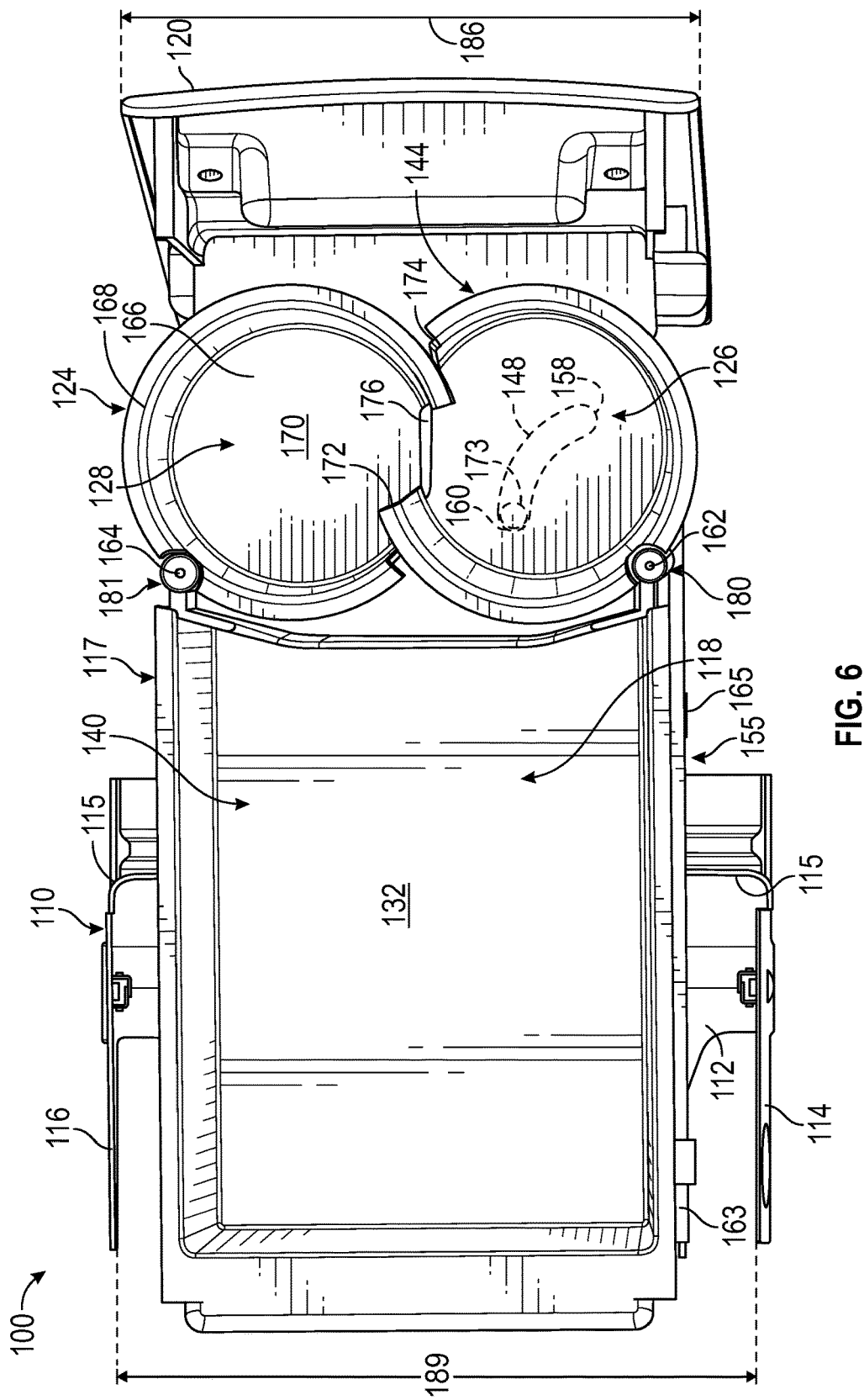
FIG. 6 is a top view of the console assembly of FIG. 1, wherein the slider structure is shown in a second position and the cup holder structure is shown in the retracted position.
Figure 7:
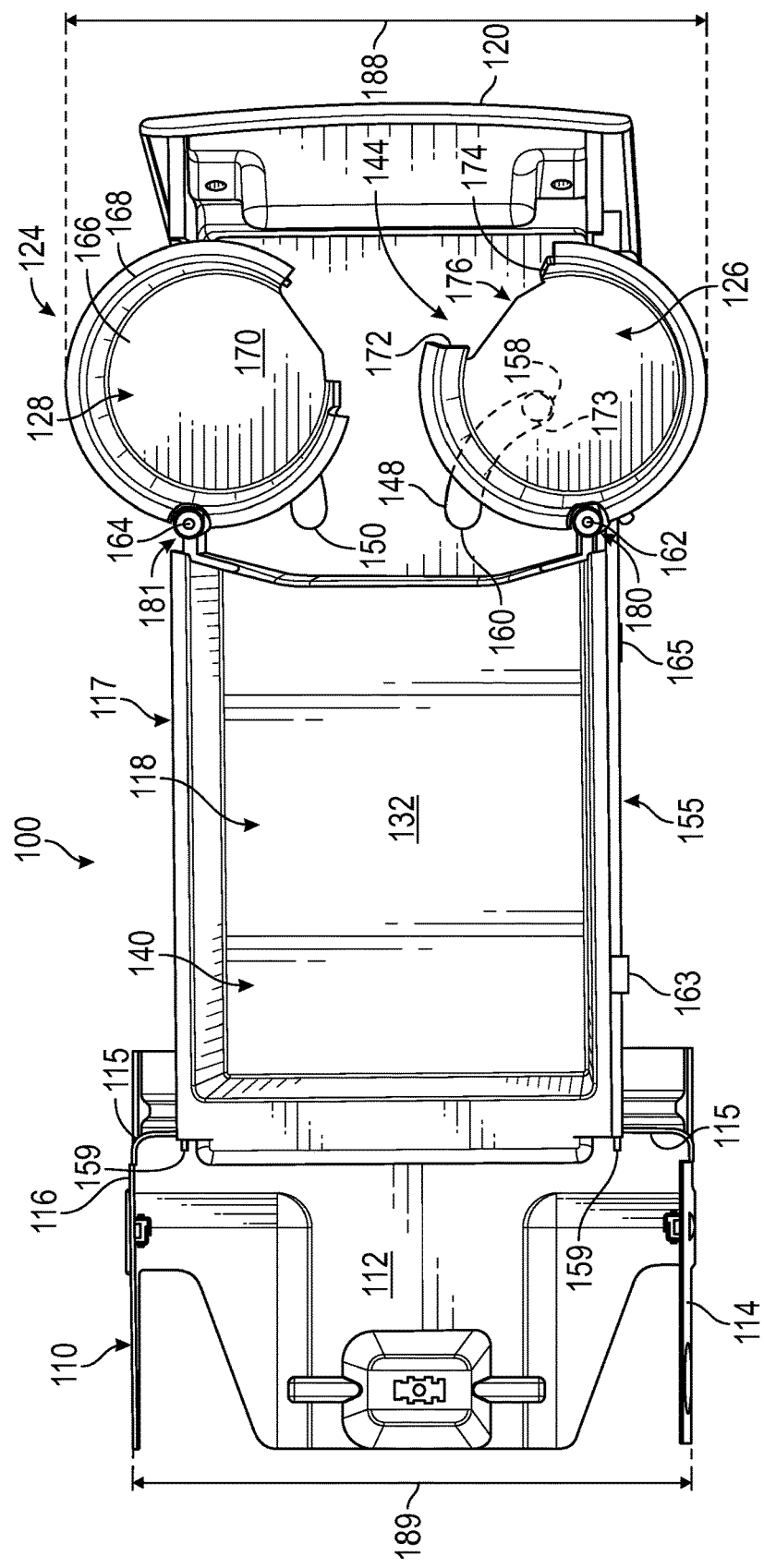
FIG. 7 is a top view of the console assembly of FIG. 1, wherein the slider structure is shown in a third position and the cup holder structure is shown in the extended position.

Moreover, the console assembly 100 may generally include a cup holder structure 124. The cup holder structure 124 may include at least one cup holder, such as a first cup holder 126 and a second cup holder 128. The first and second cup holders 126, 128 may be supported on the slider structure 118. The first and second cup holders 126, 128 may be supported for movement between a retracted position (FIGS. 3, 5, and 6) and an extended position (FIGS. 4 and 7).

As will be discussed in detail, the console assembly 100 may be configured such that the movement of the first and second cup holders 126, 128 occurs in connection with the sliding actuation of the slider structure 118. For example, the slider structure 118 may have a range of motion over which the slider structure 118 slides outwardly and inwardly relative to the console structure 102. This motion of the slider structure 118 may cause movement of the cup holders 126, 128 in some embodiments. Also, in some embodiments, as the slider structure 118 slides through a first portion of this range of motion, the first and second cup holders 126, 128 may remain in their respective retracted positions. As the slider structure 118 slides through a second portion of this range of motion, the first and second cup holders 126, 128 may move between the retracted position and the extended position. Thus, the movement of the cup holders 126, 128 may be controlled, for example, to fit within a relatively small available space within the vehicle.

Figure 2:
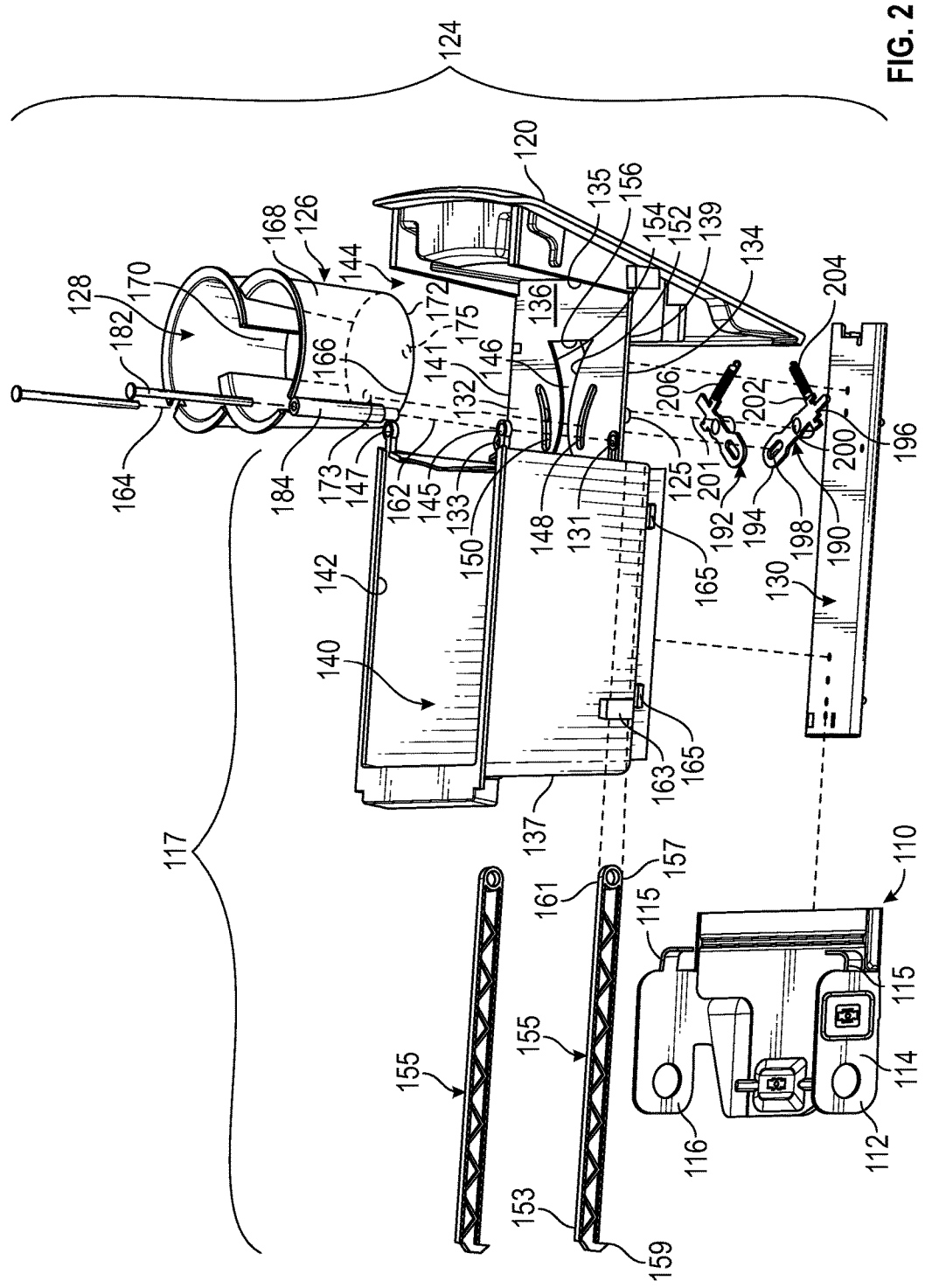
FIG. 2 is an exploded view of the console assembly of FIG. 1.
Figure 3:
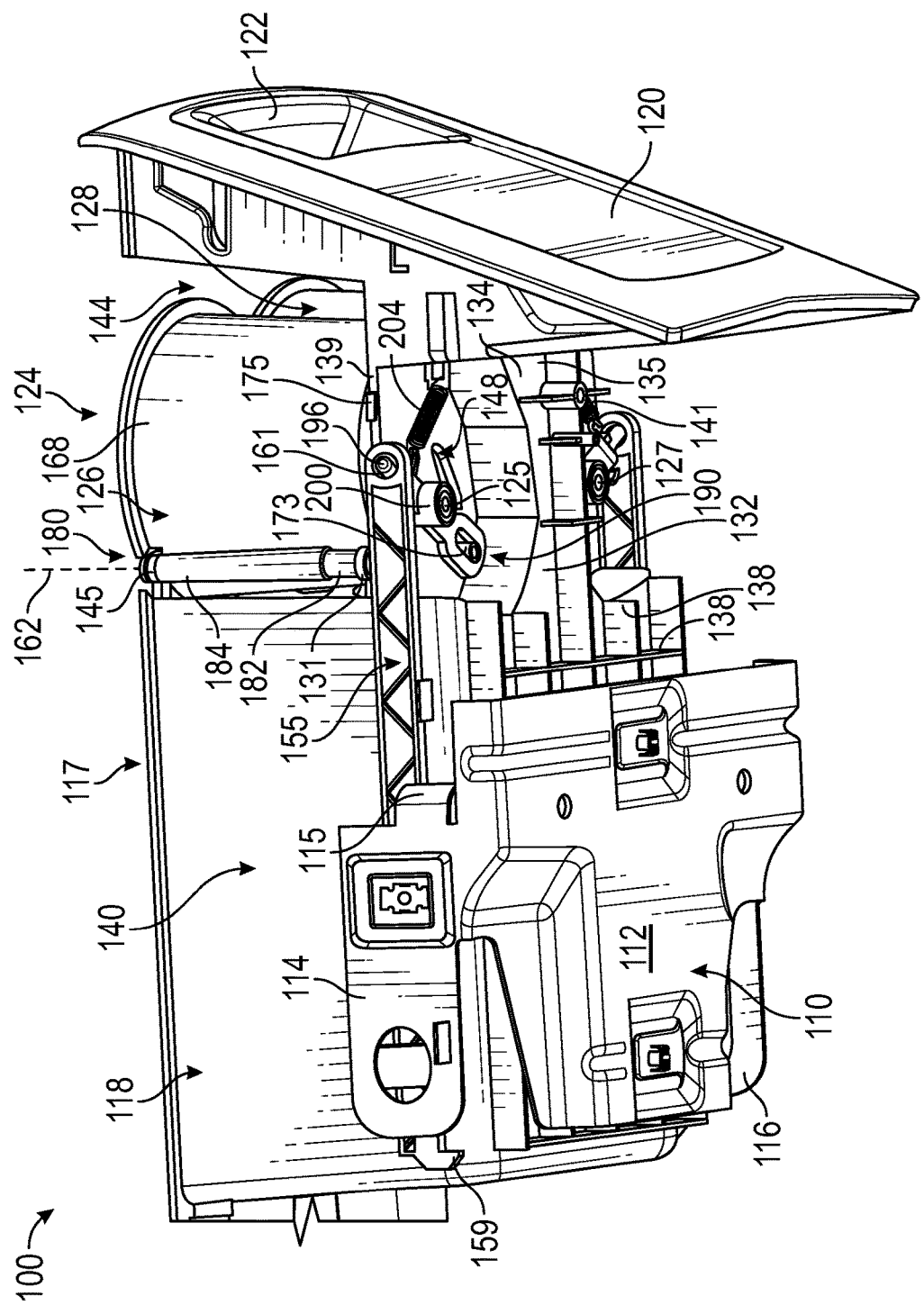
FIG. 3 is a lower perspective view of the console assembly of FIG. 1, wherein a cup holder structure of the console assembly is shown in a retracted position.
Figure 4:
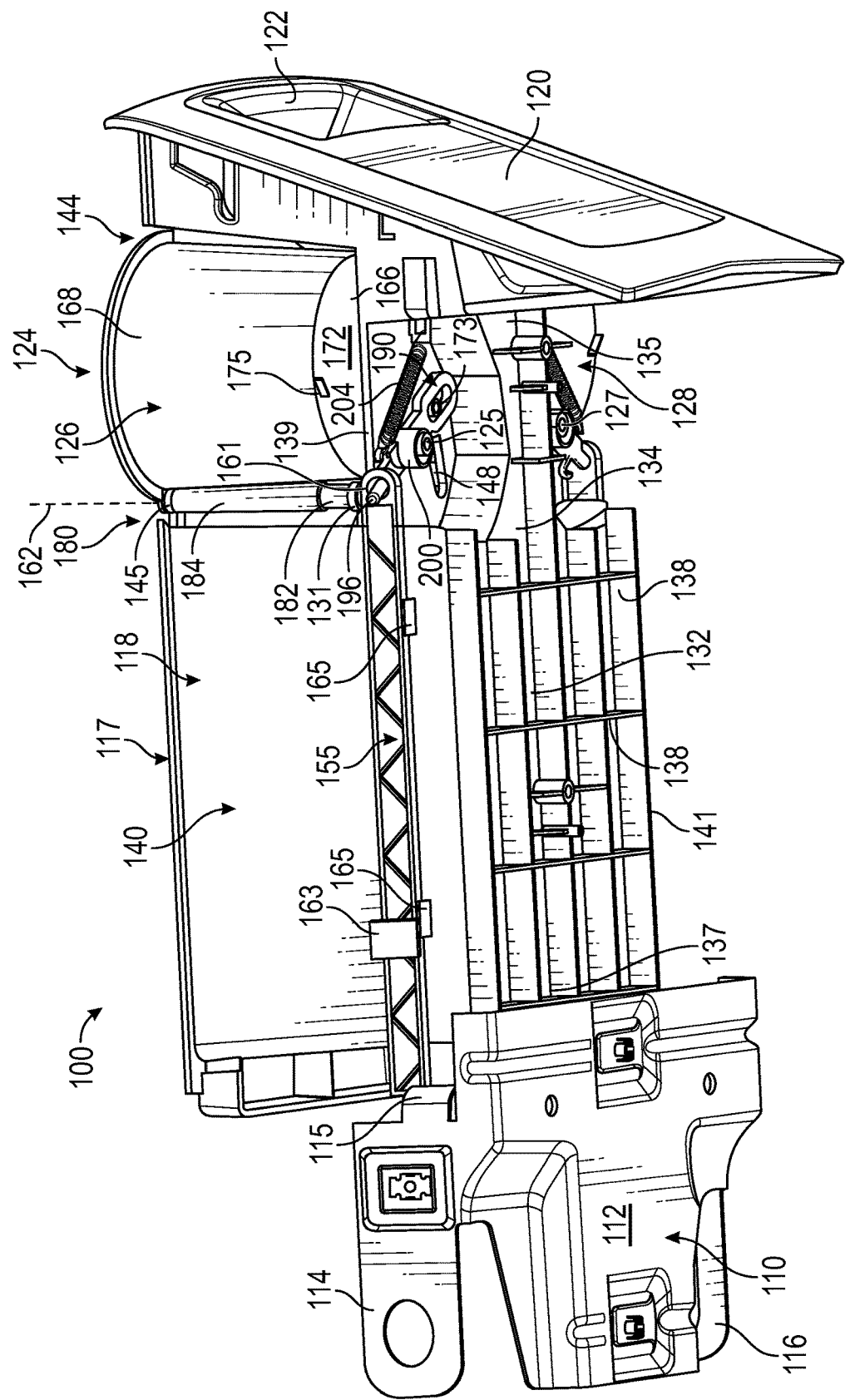
FIG. 4 is a lower perspective view of the console assembly of FIG. 1, wherein the cup holder structure of the console assembly is shown in an extended position.

Referring now to FIGS. 2-4, the slider structure 118 will be discussed in greater detail according to example embodiments. The slider structure 118 may include a base 132. The base 132 may be elongate and may include an underside 134 (FIGS. 3 and 4). The base 132 may also include an outer end 135 and an inner end 137, a first side 139, and a second side 141.

As shown, the underside 134 may include a first projection 125 and a second projection 127. The first projection 125 and/or second projection 127 may be a rounded boss that projects downward from the underside 134. The first and second projections 125, 127 may be spaced apart from each other in a width direction such that the first projection 125 is proximate the first side 139 and the second projection 127 is proximate the second side 141.

The underside 134 may further include a plurality of stiffening projections 138, such as ribs that extend in various directions along the underside 134. The stiffening projections 138 may provide stiffness, for example, to resist bending along various directions. Also, as shown in FIG. 2, the slider bearing 130 may be operably attached to the underside 134 of the base 132, for example, by bolts, screws, rivets, or other fasteners.

The slider structure 118 may additionally include a storage bin 140 as shown in FIG. 2. The storage bin 140 may be disposed on the top side 136 of the base 132. The storage bin 140 may be cuboid and box-like, and the storage bin 140 may include an open top 142.

Furthermore, the outer end 135 of the slider structure 118 may support the end cap 120 of the console assembly 100. The end cap 120 may be separated at a distance from the storage bin 140. Accordingly, an intermediate space 144 may be defined between the end cap 120 and the front wall of the storage bin 140.

As shown in FIG. 2, the base 132 of the slider structure 118 may include a first lower hinge joint support 131 and a second lower hinge joint support 133. Also, the slider structure 118 may include a first upper hinge joint support 145 and a second upper hinge joint support 147.

The first lower hinge joint support 131 may be disposed proximate the first side 139, near the storage bin 140. In some embodiments, the first lower hinge joint support 131 may be a rounded, short, cylindrical projection. In additional embodiments, the first lower hinge joint support 131 may include a through-hole that extends through the base 132. The first upper hinge joint support 145 may project horizontally from the top end of the front wall of the storage bin 140. The first upper hinge joint support 145 may be substantially annular in shape. The first upper hinge joint support 145 may be spaced apart along a first axis 162. The first axis 162 may extend in the generally vertical direction and substantially perpendicular to the base 132.

The second lower hinge joint support 133 may be substantially similar to the first lower hinge joint support 131, except that the second lower hinge joint support 133 may be disposed proximate the second side 141 of the slider structure 118. Likewise, the second upper hinge joint support 147 may be substantially similar to the first upper hinge joint support 145. The second upper hinge joint support 147 may be spaced apart from the second lower hinge joint support 133 along a second axis 164.

The base 132 of the slider structure 118 may include one or more apertures, for example, proximate the intermediate space 144. As shown in FIG. 2, for example, the base 132 may include a center opening 146. The center opening 146 may extend through the base 132 in a thickness direction. In some embodiments, the center opening 146 may be hourglass-shaped so as to define a first arcuate edge 152, a second arcuate edge 154 and a forward edge 156 that extends between the first and second arcuate edges 152, 154.

The base 132 may also include a first slot 148 and a second slot 150. The first and second slots 148, 150 are shown in FIG. 2, and the first slot 148 is shown in broken lines in FIGS. 5-7. The first slot 148 and the second slot 150 may extend through the thickness of the base 132.

Figure 5:
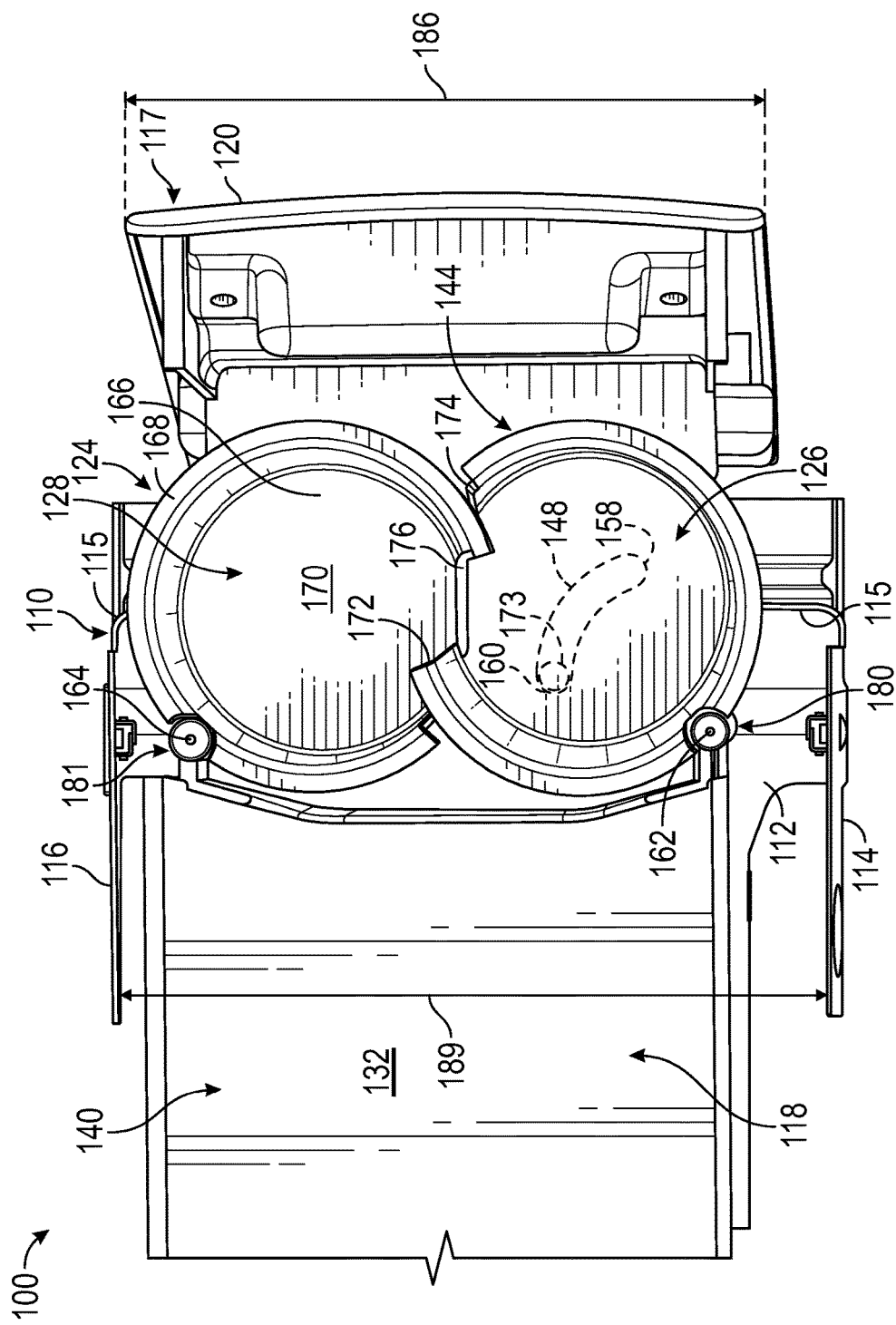
FIG. 5 is a top view of the console assembly of FIG. 1, wherein a slider structure of the console assembly is shown in a first position and the cup holder structure is shown in the retracted position.

The first slot 148 may be disposed between the first arcuate edge 152 and the first side 139. Also, the as shown in FIGS. 5-7, the first slot 148 may extend non-linearly between a first end 158 and a second end 160. In some embodiments, the major axis of first slot 148 may extend generally arcuately. The axis of the first slot 148 may extend generally about the first axis 162. However, the axis of the first slot 148 may be eccentric relative to the first axis 162. The second slot 150 may be substantially the same as the first slot 148, except the second slot 150 may extend generally about (but eccentric to) the second axis 164.

The console assembly 100 may further include one or more elongate members 155. The elongate members 155 may extend substantially along the horizontal direction and may include a respective first end 157 and a respective second end 153. The first end 157 may include an engagement member 159, such as a downwardly projecting hook. The second end 153 may include an aperture 161. Also, the elongate members 155 may be attached to the slider structure 118. For example, one elongate member 155 may be received within a bracket opening 163 disposed on the first side 139 of the storage bin 140. The elongate member 155 may also be supported atop one or more support projections 165 that project from the first side 139 of the storage bin 140. Accordingly, the elongate member 155 may be supported for linear, horizontal movement in either direction through the bracket opening 163 and atop the support projections 165. It will be appreciated that the other elongate member 155 may be similarly attached to the slider structure 118 on the second side 141 of the storage bin 140.

As shown in FIGS. 5-7, the cup holder structure 124 may include the first cup holder 126 and the second cup holder 128 as mentioned above. The first cup holder 126 and/or the second cup holder 128 may include a bottom member 166 and a side member 168 in some embodiments.

The bottom member 166 may be substantially flat with a top side 170 and a bottom side 172. At least part of the bottom side 172 may be supported for sliding movement atop the top surface 136 of the base 132. The bottom side 172 may also include a first projection 173 and a second projection 175, which project vertically downward from surrounding areas of the bottom side 172. The first projection 173 and the second projection 175 may be spaced apart circumferentially from each other on the bottom side 172. Also, the first and second projections 173, 175 may be disposed proximate the periphery of the bottom member 166.

The side member 168 may extend upward from the top side 170 of the bottom member 166, and the side member 168 may extend at least partly about the periphery of the bottom member 166. The bottom member 166 and the side member 168 may cooperate to define a cavity 170 configured to receive a cup, bottle, or other container. It will be appreciated that the bottom member 166 may be configured to support the bottom of the container, and the side member 168 may be configured to support a side of the container and maintain the container supported on the bottom member 166. Accordingly, the cup holder(s) 126, 128 may secure and support the container on the console assembly 100.

The bottom member 166 may be substantially circular, and the side member 168 may extend accurately about the periphery of the bottom member 166. Thus, the cavity 170 may be substantially rounded and cylindrical. However, it will be appreciated that these shapes may vary, for example, to accommodate a variety of container shapes and dimensions. Also, in some embodiments, the cavity 170 may be relatively wide to accommodate larger containers.

As shown in FIGS. 5-7, the side member 168 may extend partially about the periphery of the bottom member 166. As such, the side member 168 may include a first circumferential end 172 and a second circumferential end 174, which are spaced apart from each other to define a space 176 therebetween. In some embodiments, the space 176 may accommodate a coffee mug handle or other radially projecting member of the container.

In some embodiments, the first cup holder 126 may be supported for movement on the slider structure 118. For example, the first cup holder 126 may be supported for angular movement (i.e., rotation) relative to the slider structure 118. Specifically, the side member 168 of the first cup holder 126 may be attached via a first hinge joint 180.

The first hinge joint 180 may include a receiver 184. The receiver 184 may extend substantially vertically along an outer surface of the side member 168. The first hinge joint 180 may also include a pin 182, which is received in the first upper hinge joint support 145, the receiver 184, and the first lower hinge joint support 131. Furthermore, as shown in FIGS. 3-7, the first projection 173 may be received in the first slot 148.

Accordingly, the first cup holder 126 may be supported for rotation by the slider structure 118 about the first axis 162 via the first hinge joint 180. Specifically, the first cup holder 126 may be supported for movement between a retracted position (FIGS. 3, 5 and 6) and an extended position (FIGS. 4 and 7). In the retracted position, the first cup holder 126 may be received and disposed substantially within the intermediate space 144 of the slider structure 118. Also, in the extended position, a portion of the bottom member 166 and the side member 168 may be disposed outboard from the first side 139 of the slider structure 118. Also, as shown in FIGS. 5-7, the first projection 173 may move between the first end 158 and the second end 160 of the slot 148 as the cup holder 126 moves between the retracted position and the extended position. Moreover, the projection 175 may be spaced away from the first side 139 when in the extended position (FIG. 4), and the projection 175 may abut against the first side 139 of the slider structure 118 when the cup holder 126 is in the retracted position (FIG. 3). In some embodiments, this abutment may limit movement of the first cup holder 126.

The second cup holder 128 may be supported by the slider structure 118 similar to the first cup holder 128. Thus, the second cup holder 128 may be supported for rotation via a second hinge joint 181 (FIGS. 5-7). Accordingly, the second cup holder 128 may rotate between a retracted position and an extended position.

When the cup holders 126, 128 are in their respective retracted positions, the cup holders 126, 128 may collectively define a retracted width 186 (FIGS. 5 and 6). When the cup holders 126, 128 are in their respective extended positions, the cup holders 126, 128 may collectively define an extended width 188 (FIG. 7). The retracted width 186 and the extended width 188 may be measured between the outer periphery of the first cup holder 126 and the opposite outer periphery of the second cup holder 128 as shown. Also, the retracted width 186 may be less than the extended width 188. Furthermore, the retracted width 186 may be less than a width 189 of the opening 108 in the console structure 102 (FIGS. 1, 5, and 6). Accordingly, the first and second cup holders 126, 128 may move to accommodate movement of the slider structure 118 in and out of the opening 108 in the console structure 102 as will be discussed in greater detail below.

Furthermore, in some embodiments, the first and second cup holders 126, 128 may be configured to move together when moving between their respective extended positions and retracted positions. In some embodiments, the first and second cup holders 126, 128 may both move toward the respective extended positions simultaneously. Also, in some embodiments, the first and second cup holders 126, 128 may move toward the respective retracted positions simultaneously.

In some embodiments, the first and second cup holders 126, 128 may nest together when in their respective retracted positions as shown in FIGS. 5 and 6. For example, the space 176 in the first cup holder 126 may receive at least a portion of the second cup holder 126 and vice versa. Also, the space 176 in the first cup holder 126 may accommodate movement of the second cup holder 128 toward the retracted position and vice versa. Also, when the cup holders 126, 128 are nested together as shown in FIGS. 5 and 6, one or both cup holders 126, 128 may still be able to accommodate a container. Also, in some embodiments, part of the open space 176 may remain open to accommodate a coffee mug handle or other radially extending member of the container.

As shown in FIG. 2, the cup holder structure 124 may further include a first actuation arm 190 and a second actuation arm 192. The first and second actuation arm 190, 192 may be substantially similar to each other. As an example, the first actuation arm 190 may be elongate and flat with a first end 194 and an opposite second end 196. The first end 194 may define an end aperture 198 (e.g., a slot). The second end 196 may define a hook 202. The first actuation arm 190 may also include an intermediate aperture 200 (e.g., a through-hole and/or a hollow tube), which is disposed between the first end 194 and the second end 196.

In some embodiments, the intermediate aperture 200 may receive the first projection 125 of the slider structure 118. Thus, the first actuation arm 190 may be supported for rotation below the slider structure 118 about an axis 201. Also, the first projection 173 of the first cup holder 126 may extend through the first slot 148 of the slider structure 118 to be received within the end aperture 198 of the first actuation arm 190. Accordingly, as will be discussed, the first actuation arm 190 may rotate about the axis 201 as the first cup holder 126 rotates between its retracted and extended positions.

Moreover, the first actuation arm 190 may be moveably coupled to one of the elongate members 155. For example, the aperture 161 of the elongate member 155 may receive (e.g., hook onto) the second end 196 of the first actuation arm 190.

The second actuation arm 192 may be similarly constructed to the first actuation arm 190. Also, the second actuation arm 192 may be rotationally attached to the slider structure 118 via the second projection 127. Moreover, like the first actuation arm 192, the second actuation arm 192 may be coupled to the second cup holder 128. In addition, the second actuation arm 192 may be coupled to the elongate member 155 disposed on the second side 141 of the slider structure 118.

Moreover, the cup holder structure 124 may further include at least one biasing member that biases the first and/or second cup holder 126, 128 along at least one direction. For example, as shown in FIG. 2, the cup holder structure 124 may include a first biasing member 204 and a second biasing member 206. The first and/or second biasing members 204, 206 may be helical tension springs in some embodiments. As shown in FIGS. 3 and 4, one end of the first biasing member 204 may be attached to the underside 134 of the slider structure 118. The opposite end of the first biasing member 204 may be attached (e.g., hooked) to the hook 202 of the first actuation arm 190. The second biasing member 206 may be similar attached between the slider structure 118 and the second actuation arm 192. As will be discussed, the first biasing member 204 may apply a biasing force to pull the first actuation arm 190 in rotation and to bias the first cup holder 126 toward the retracted position. Likewise, the second biasing member 206 may apply a biasing force to pull the second actuation arm 192 in rotation and to bias the second cup holder 128 toward the retracted position.

Operation of the console assembly 100 will now be discussed. It will be appreciated that the console assembly 100 is initially disposed in the position represented in FIGS. 3 and 5 (with the slider structure 118 in the first closed position and the cup holders 126, 128 in the retracted positions).

The user may manually pull on the handle 122 and pull the slider structure 118 out of the opening 108 to an open, intermediate position represented in FIG. 6. The biasing members 204, 206 may bias the actuation arms 190, 192 during this movement such that the first and second cup holders 126, 128 remain in their respective retracted positions.

The user may continue to pull out the slider structure 118 toward the fully-open. Eventually, the engagement member 159 of the elongate members 155 may engage the engagement members 115 of the support bracket 110. Thus, further pulling by the user to the fully-open position shown in FIG. 7 can cause the elongate members 155 to pull and rotate the actuation arms 190, 192 against the biasing force of the biasing members 204, 206. The cup holders 126, 128 may rotate about their respective axes 162, 164. The projections 173, 173 may slide within the respective slots 148, 150 as well. As a result, the first and second cup holders 126, 128 may be pulled from the respective retracted positions to the extended positions.

Accordingly, the cup holders 126, 128 may remain in the retracted position as the slider structure 118 initially slides out from the console structure 102 (i.e., actuation of the cup holders 126, 128 may be delayed). Once the slider structure 118 is pulled fully open, the cup holders 126, 128 may move to the extended positions.

To close the console assembly 100, the user may push the slider structure 118 into the opening 108 from the position of FIG. 7 toward the intermediate position of FIG. 6 and eventually toward the closed position of FIG. 5. During this movement, the first and second biasing members 204, 206 may bias and pull the actuation arms 190, 192, causing the first and second cup holders 126, 128 to bias toward the retracted position of FIGS. 5 and 6.

In summary, the console assembly 100 may conveniently provide a storage bin 140 or other feature for the vehicle occupants. The slider structure 118 may slide out of the console structure 102 along a relatively long range of motion, for example, to expose a large portion of the storage bin 140. The cup holders 126, 128 may remain in the retracted positions so as to avoid any surrounding structure (e.g., seats, etc.) during the majority of the movement of the slider structure 118. Once the slider structure 118 is almost fully open, the cup holders 126, 128 may extend out. Thus, the slider structure 118 and cup holders 126, 128 may be provided within a relatively small space (e.g., a narrow space) within the vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A console assembly for a vehicle comprising:
   a console structure with an opening and a first engagement member supported proximate the opening;
   a movable structure with a storage bin, the movable structure received within the opening and supported for movement relative to the console structure through a range of motion to open and close the storage bin, the range of motion including a first position, a second position, and a third position of the movable structure relative to the console structure, the movable structure configured to move through the second position as the movable structure moves between the first position and the third position;
   a cup holder structure that is supported by the movable structure, the cup holder structure including a cup holder that is supported by the movable structure, the cup holder supported for movement between a retracted position and an extended position relative to the movable structure, the cup holder configured to remain substantially in the retracted position as the movable structure moves between the first position and the second position, the cup holder configured to move between the retracted position and the extended position as the movable structure moves between the second position and the third position; and
   an elongate member having a second engagement member, the elongate member being attached to the movable structure and the cup holder structure, the first engagement member being configured to engage the second engagement member as the movable structure reaches the second position, thereby causing the elongate member to actuate the cup holder from the retracted position to the extended position as the movable structure moves from the second position to the third position.

2. The console assembly of claim 1, wherein the movable structure is supported for sliding movement inward and outward from the opening between the first position, the second position, and the third position.

3. The console assembly of claim 1, wherein the elongate member is supported for movement relative to the movable structure;
   the movable structure supported for movement from the second position to the third position when the second engagement member engages the first engagement member, thereby causing the elongate member to actuate the cup holder from the retracted position to the extended position.

4. The console assembly of claim 3, wherein the cup holder structure includes an actuation arm;
   wherein the actuation arm is coupled to the cup holder;
   wherein the actuation arm is coupled to the elongate member;
   wherein the actuation arm is pivotally mounted to the movable structure;
   wherein the elongate member is configured to rotate the actuation arm relative to the movable structure as the movable structure moves from the second position to the third position to actuate the cup holder from the retracted position to the extended position.

5. The console assembly of claim 4, wherein the cup holder structure further includes a biasing member that is attached to the actuation arm;
   wherein the elongate member is configured to rotate the actuation arm in a first direction as the movable structure moves from the second position to the third position; and
   wherein the biasing member biases the actuation arm in a second direction as the movable structure moves from the third position to the second position to bias the cup holder toward the retracted position.

6. The console assembly of claim 4, wherein the movable structure includes an aperture;
   further comprising a joint that attaches the cup holder to the actuation arm;
   wherein at least part of the joint is received within the aperture of the movable structure.

7. The console assembly of claim 1, wherein the cup holder is supported for rotational movement about a substantially vertical axis by the movable structure between the retracted position and the extended position.

8. The console assembly of claim 1, wherein the cup holder is a first cup holder, the cup holder structure further comprising a second cup holder;
   wherein the first cup holder and the second cup holder are each supported for movement by the movable structure between respective retracted positions and respective extended positions; and
   wherein at least one of the first cup holder and the second cup holder are configured to nest together when in the respective retracted positions.

9. The console assembly of claim 1, wherein the cup holder includes a bottom member and a side member that cooperate to define a receptacle; and
   wherein the receptacle is configured to receive a container.

10. The console assembly of claim 1, further comprising a biasing member that biases the cup holder toward the retracted position.

11. The console assembly of claim 1, wherein the movable structure is supported for linear sliding movement along a substantially horizontal axis inward and outward from the opening between the first position, the second position, and the third position; and
    wherein the cup holder is supported for rotational movement about a substantially vertical axis by the movable structure between the retracted position and the extended position.

12. The console assembly of claim 1, wherein the cup holder is a first cup holder, the cup holder structure further comprising a second cup holder;
    wherein the first cup holder and the second cup holder are each supported for rotational movement by the movable structure for movement between respective retracted positions and respective extended positions; and
    wherein the first cup holder and the second cup holder are configured to rotate in opposite directions during movement between the respective retracted positions and the respective extended positions.

13. The console assembly of claim 1, wherein the cup holder includes an abutment member that is configured to abut the movable structure to limit movement of the cup holder as the cup holder moves from the extended position toward the retracted position.

14. A console assembly for a vehicle comprising:
    a console structure having a first engagement member and an opening;
    a slider structure that is received within the opening and that is supported for sliding movement relative to the console structure between a first position, a second position, and a third position, the slider structure configured to move through the second position as the slider structure moves between the first position and the third position;
    a cup holder structure that is supported by the slider structure, the cup holder structure including a cup holder that is supported for rotational movement by the slider structure between a retracted position and an extended position, the cup holder configured to remain substantially in the retracted position as the slider structure slides between the first position and the second position, the cup holder configured to rotate between the retracted position and the extended position as the slider structure moves between the second position and the third position; and
    an elongate member having a second engagement member, wherein the first engagement member is configured to engage the second engagement member at the second position of the slider structure, and wherein the elongate member is coupled to the cup holder structure to rotate the cup holder from the retracted position to the extended position as the slider structure moves from the second position to the third position.

15. The console assembly of claim 14, wherein the cup holder structure includes an actuation arm;
    wherein the actuation arm is coupled to the cup holder;
    wherein the actuation arm is coupled to the elongate member;
    wherein the actuation arm is pivotally mounted to the slider structure;
    wherein the elongate member is configured to rotate the actuation arm relative to the movable structure as the slider structure moves from the second position to the third position to actuate the cup holder from the retracted position to the extended position.

16. The console assembly of claim 15, wherein the cup holder structure further includes a biasing member that is attached to the actuation arm;
    wherein the elongate member is configured to rotate the actuation arm in a first direction as the slider structure moves from the second position to the third position; and
    wherein the biasing member biases the actuation arm in a second direction as the slider structure moves from the third position to the second position to bias the cup holder toward the retracted position.

17. The console assembly of claim 14, wherein the cup holder includes a bottom member and a side member that cooperate to define a receptacle; and
    wherein the receptacle is configured to receive a container.

18. The console assembly of claim 14, further comprising a biasing member that biases the cup holder toward the retracted position.

19. A vehicle comprising:
    a console structure having a first engagement member and an opening;
    a slider structure that is received within the opening and that is supported for sliding movement relative to the console structure between a first position, a second position, and a third position, the slider structure configured to move through the second position as the slider structure moves between the first position and the third position;
    a cup holder structure that is supported by the slider structure, the cup holder structure including a cup holder that is supported for rotational movement by the slider structure between a retracted position and an extended position, the cup holder configured to remain substantially in the retracted position as the slider structure slides between the first position and the second position, the cup holder configured to rotate between the retracted position and the extended position as the slider structure moves between the second position and the third position; and
    an elongate member having a second engagement member, wherein the first engagement member is configured to engage the second engagement member at the second position of the slider structure, and wherein the elongate member is coupled to the cup holder structure to rotate the cup holder from the retracted position to the extended position as the slider structure moves from the second position to the third position.

\* \* \* \* \*